United States Patent

Dalferth

[11] Patent Number: 5,533,938
[45] Date of Patent: Jul. 9, 1996

[54] POCKET CHAIN WHEEL

[75] Inventor: Hans H. Dalferth, Aalen, Germany

[73] Assignee: RUD-Kettenfabrik Rieger & Dietz GmbH u. Co., Aalen-Unterkochen, Germany

[21] Appl. No.: 449,230

[22] Filed: May 24, 1995

[30] Foreign Application Priority Data

Jun. 1, 1994 [DE] Germany .................. 44 20 344.6

[51] Int. Cl.⁶ .................................................. F16H 55/30
[52] U.S. Cl. .................................................. 474/164
[58] Field of Search ............................... 474/155–157, 474/164; 110/330

[56] References Cited

U.S. PATENT DOCUMENTS

| | | | |
|---|---|---|---|
| 325,539 | 9/1885 | Herman | 474/164 |
| 662,768 | 11/1900 | Crowe | 474/164 X |
| 2,321,702 | 6/1943 | Renkin | 474/155 |
| 3,362,239 | 1/1968 | Kaye et al. | 474/155 |
| 3,415,135 | 12/1968 | Royer et al. | 474/164 X |
| 4,108,014 | 8/1978 | Schreyer et al. | 74/243 H |

*Primary Examiner*—Roger J. Schoeppel
*Attorney, Agent, or Firm*—Mark P. Stone

[57] ABSTRACT

In a pocket chain wheel having two groups of pockets (1) for chain links (5) passing the wheel at a tilt, said groups of pockets being arranged side by side in a view perpendicular to the wheel axis (3), the bases (2) of the pockets (1) are shaped such that those legs (4) of the chain links (5) which face the wheel axis (3) are supported, within the pockets (1), only in the curved regions of the transition of the nose ends (6) of the chain links (5) into their legs (4) respectively facing the wheel axis (3). In this way, the stress upon those legs (4) of the chain links which face the wheel axis (3) is significantly relieved and an increase achieved in the service life of said chain links.

4 Claims, 1 Drawing Sheet

POCKET CHAIN WHEEL

BACKGROUND OF THE INVENTION

The invention relates to a pocket chain wheel having two groups of pockets for chain links passing the wheel at a tilt, said groups of pockets being arranged side by side in a view perpendicular to the wheel axis, in which the pockets of the one group are offset relative to the pockets of the other group, in the peripheral direction of the wheel, by half a pocket pitch respectively, and in which the pockets exhibit bases, for supporting the legs facing the wheel axis, and bearing surfaces, formed by webs, for supporting those legs of the chain links which are facing away from the wheel axis.

A pocket chain wheel of the above type is known from U.S. Pat. No. 4,108,014. In this pocket chain wheel, the pockets support those legs of the chain links which face the wheel axis across virtually the whole of their length, i.e. from the middle of the link into the region of the link nose ends, whilst the support of the legs facing away from the wheel axis is attended to by flat bearing surfaces formed by webs which form partitions between successive pockets, a chain member being supported, in each case, on the base of the one pocket group and the webs of the other pocket group. The use of the known chain wheel in chain hoists leads to problems wherever there are relatively large loads to be lifted rapidly. The stresses which arise in such cases result in premature chain link fractures, the cause of which can be sought, in particular, in adverse bending stresses upon the chain link legs. It has herein been assumed that these bending stresses are triggered by the weld bulges of the chain links and, for this reason, the centers of the flat bearing surfaces have been furnished with recesses for the weld bulges. A notable improvement in the described circumstances has not however been achieved.

SUMMARY OF THE INVENTION

The object of the invention is to design a pocket chain wheel of the considered type with a view to increasing the service life of the chains which pass it. This object is achieved according to the invention by virtue of the fact that, in a chain wheel of the generic type, the bases of the pockets are shaped such that those legs of the chain links which face the wheel axis are supported, within the pockets, only in the curved regions of the transition of the nose ends of the chain links into their legs facing the wheel axis.

The proposed measure leads to a displacement of the points of application of the forces acting upon those chain link legs which are subjected, in each case, to the greatest stress in the direction of the crowns of the nose ends of the chain links, i.e. into regions which, as a result of the nose ends of respectively preceding or succeeding chain links, are afforded a contrary support, so that the forces conducted by the pocket base into the respective link leg are largely compensated.

BRIEF DESCRIPTION OF THE DRAWINGS

Further details and features of the invention derive from the subclaims and the following description of a particularly advantageous embodiment represented in the appended drawing, in which:

DESCRIPTION OF THE BEST MODE FOR CARRYING OUT THE INVENTION

Figure 1:
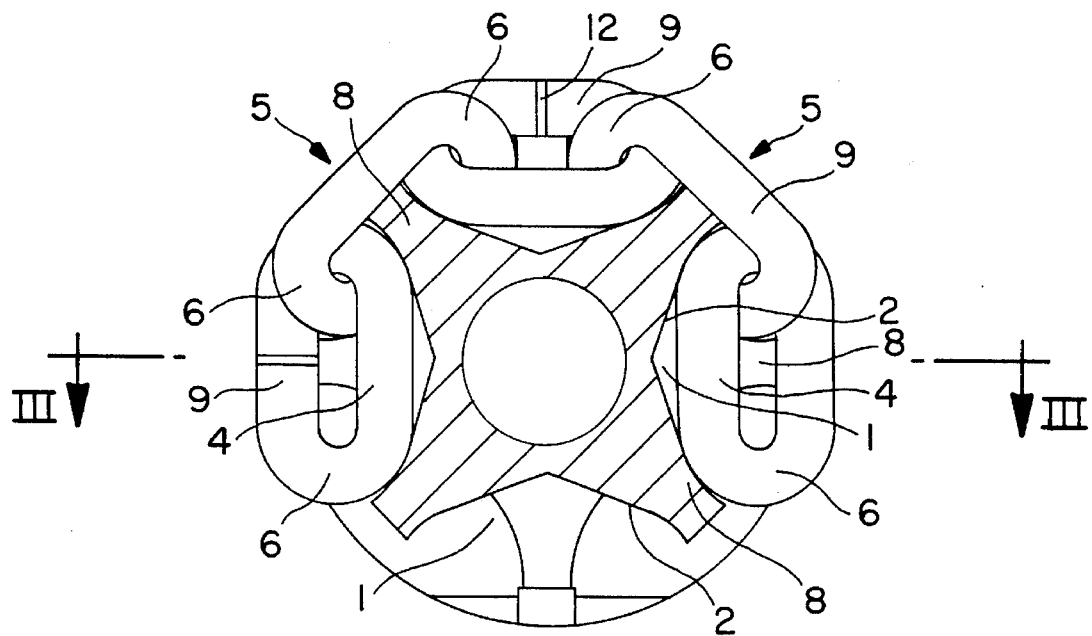
FIG. 1 shows a section along the line I—I in FIG. 2, which section runs perpendicular to the axis of the pocket chain wheel.
Figure 2:
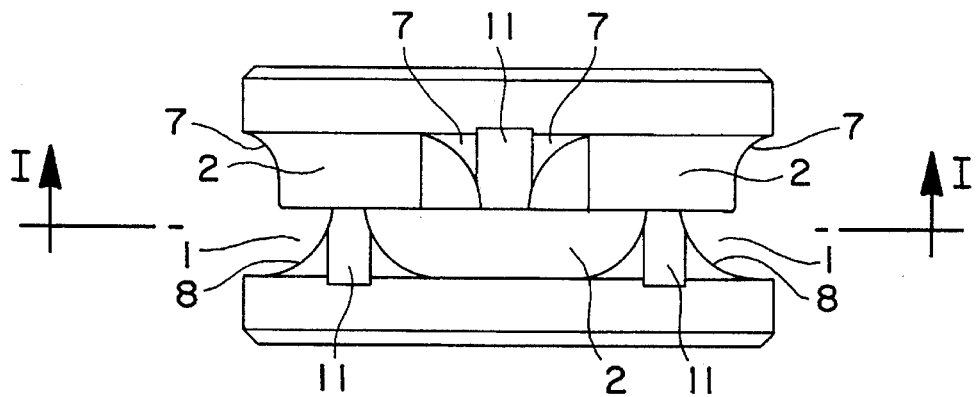
FIG. 2 shows a top view of the pocket chain wheel according to FIG. 1.
Figure 3:
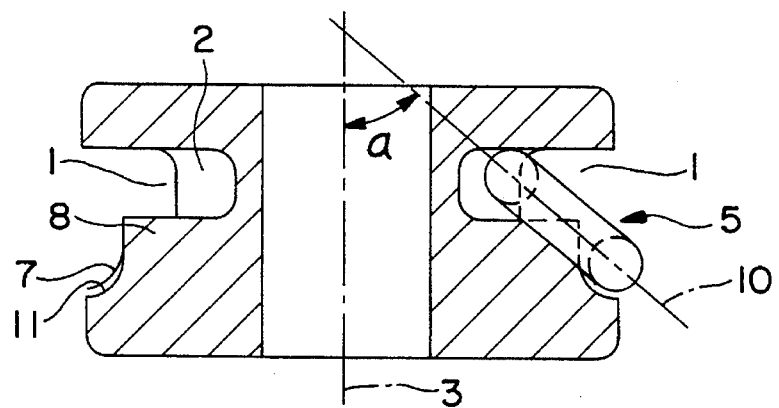
FIG. 3 shows a section along the line III—III in FIG. 1, which section runs in the direction of the axis of the pocket chain wheel.

The depicted pocket chain wheel is provided with two groups of, in each case, four pockets, the pockets of the one group being offset relative to the pockets of the second group, in the peripheral direction of the wheel, by half a pocket pitch respectively. Each pocket 1 has a base 2, which is configured such that those legs 4 of the chain links 5 which face the wheel axis 3 are supported, within the pockets 1, only in the curved regions of the transition of the nose ends 6 into the legs 4 of the chain links 5. The base can herein be configured, as represented in the drawing, essentially in a substantially V-shaped or, indeed, concave design. An additional support is afforded to the chain links 5 by the bearing surfaces 7 of webs 8, the mutually opposing sides of which form end walls of the pockets 1. These bearing surfaces 7 support those legs 9 of the chain links 5 which are facing away from the wheel axis 3, so that their middle plane 10 assumes, relative to the wheel axis 3, an angle α of 45° to 50°.

Studies have shown that those legs 9 of the chain links 5 which are facing away from the wheel axis are subjected to significantly less stress than the legs 4 facing the wheel axis 3. All the same, it is shown to be expedient to provide recesses 11 in the region of the bearing surfaces 7 of the webs 8 in order to prevent contact between the weld bulges 12 of the chain links 5 and the bearing surfaces 7.

I claim:

1. A pocket chain wheel having two groups of pockets for chain links passing the wheel at a tilt, said groups of pockets being arranged side by side in a view perpendicular to the wheel axis, in which the pockets of the one group are offset relative to the pockets of the other group, in the peripheral direction of the wheel, by half a pocket pitch respectively, and in which the pockets exhibit bases, for supporting the legs facing the wheel axis, and bearing surfaces, formed by webs, for supporting those legs of the chain links which are facing away from the wheel axis, wherein the bases (2) of the pockets (1) are shaped such that those legs (4) of the chain links (5) which face the wheel axis (3) are supported, within the pockets (1), only in the curved regions of the transition of the nose ends (6) of the chain links (5) into their legs (4) facing the wheel axis (3).

2. The pocket chain wheel as claimed in claim 1, wherein the webs (8) forming the end walls of the successive pockets (1) are provided, on their bearing surfaces (7) for those legs (9) of the chain links (5) which are facing away from the wheel axis (3), with recesses (11) for the weld bulges (12) of the chain links.

3. The pocket wheel as claimed in claim 2, wherein the chain links (5) are supported by webs (8), which separate the bases (2) of the pockets (1) of the one pocket group and the successive pockets (1) of the respective other pocket group, such that their middle planes (10) assume, relative to the wheel axis (3), an angle (α) of 45° to 50°.

4. The pocket chain wheel as claimed in claim 1, wherein the chain links (5) are supported by webs (8), which separate the bases (2) of the pockets (1) of the one pocket group and the successive pockets (1) of the respective other pocket group, such that their middle planes (10) assume, relative to the wheel axis (3), an angle (α) of 45° to 50°.

* * * * *